United States Patent [19]

Alvelid et al.

[11] Patent Number: 4,945,770

[45] Date of Patent: Aug. 7, 1990

[54] STATE TRANSDUCERS IN COMBINATION WITH MECHANICAL COMPONENTS

[76] Inventors: Birger Alvelid, 41296 Goteborg; Ralph Crafoord, Frőunda, both of Sweden

[21] Appl. No.: 344,453

[22] Filed: Apr. 28, 1989

Related U.S. Application Data

[63] Continuation of Ser. No. 99,318, Aug. 11, 1987, abandoned.

[51] Int. Cl.⁵ .............................. G01L 5/00
[52] U.S. Cl. .......................... 73/768; 73/7; 73/862.06; 73/776; 374/142
[58] Field of Search ............... 73/7, 768, 862.06, 775, 73/776, 777; 374/142, 143; 407/119, 120

[56] References Cited

U.S. PATENT DOCUMENTS

| | | | |
|---|---|---|---|
| 3,836,834 | 9/1974 | Abbatiello et al. | 318/563 |
| 4,129,848 | 12/1978 | Frank et al. | 374/185 |
| 4,432,247 | 2/1984 | Takeno et al. | 73/776 |
| 4,722,609 | 2/1988 | Epstein et al. | 374/185 |
| 4,744,241 | 5/1988 | Mayer | 407/120 |

FOREIGN PATENT DOCUMENTS 2033308 12/1970 France.
54-154373 12/1979 Japan.
58-160045 9/1983 Japan.

OTHER PUBLICATIONS

Industriell Teknik, No. 1–2, issued 1976, "Patent-profylax 2/76", see pages 48 to 50.

Primary Examiner—Tom Noland
Attorney, Agent, or Firm—Nies, Kurz, Bergert & Tamburro

[57] ABSTRACT

A method of manufacturing state transducers for mechanical components intended to be subjected to wear, mechanical and/or thermal loads, especially state transducers for tools. The invention is characterized in that electric conductors and, where appropriate, electronic circuits (9) of microscale for measuring wear, mechanical and/or thermal loads are applied on the surface of the component (11), and a protective layer (10) is applied upon at least portions of said circuits (9) and conductors, where said conductors, circuits and said protective layer (10) are applied so as to constitute a unit atomic integrated with the mechanical component (11), which conductors and circuits are intended to be connected to a signal processing or corresponding equipment. The invention also comprises a mechanical component treated according to said method.

14 Claims, 1 Drawing Sheet

U.S. Patent
Aug. 7, 1990
4,945,770
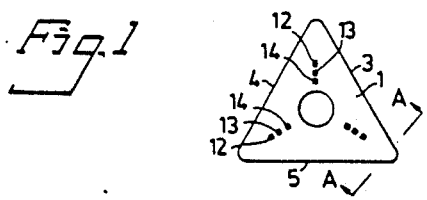
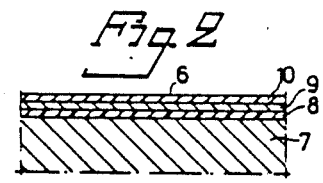
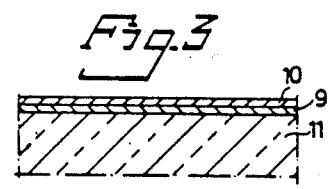
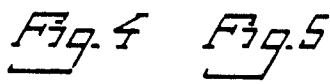
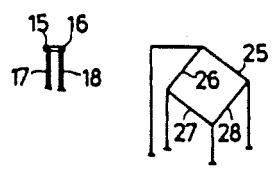
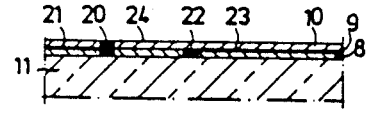
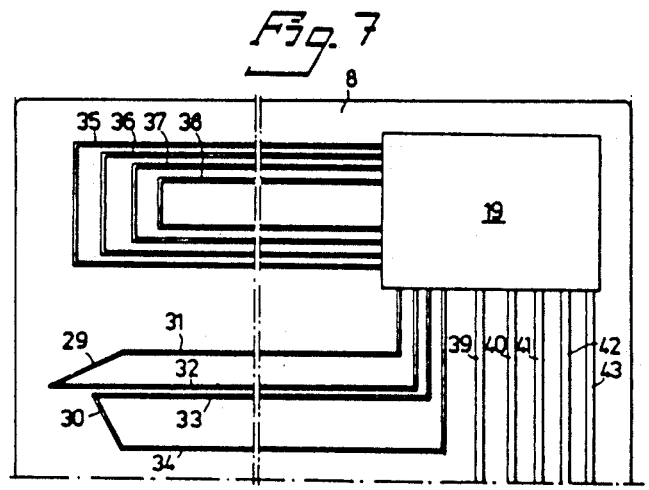

STATE TRANSDUCERS IN COMBINATION WITH MECHANICAL COMPONENTS

This application is a continuation, of application Ser. No. 07/099318, filed Aug. 11, 1987, now abandoned.

This invention relates to a method of manufacturing state transducers for mechanical components, especially for tools and machine elements. The invention further relates to mechanical components comprising such state transducers.

It has been desired for a long time to be able to detect the wear of a tool or machine element as well as the temperature and mechanical load of tool surfaces. This applies particularly to cutting and corresponding tools, which are subjected to both mechanical and thermal loads.

By knowing the conditions prevailing in the tool surfaces it would be possible to better optimize the cutting operations in respect of tool wear, tool design etc.

Heretofore it has been very difficult to obtain information on the forces acting, for example, on the edge of a cutting tool and on the temperature distribution prevailing at the use of the tool. For obtaining such information, the forces acting on the entire tool or tool holder have been measured, and thereafter the actual forces and stresses in the tool edge have been calculated.

For obtaining information on the temperature of the tool edge, temperature transmitters, such as thermocouples, were inserted in holes drilled into the tool.

The known art, thus, does not provide an efficient way of measuring temperature and mechanical forces in the cutting edge of a tool.

The conditions are corresponding for machine elements of various types. It would be of essential interest, for example, to be able to measure temperature and forces in bearings of various types, and especially in the bearing surfaces.

A great problem is involved in the measuring of tool wear and also of the wear of machine elements, for example of bearings in operation. At present, wear normally is measured by using a measuring instrument for measuring the outer dimensions of the tool or machine element. This, of course, is not possible when the tool or element are in operation.

The ever increasing employment of semi-automatic or fully automatic machine tools makes it desirable to automatically obtain information on when a tool is worn to such a degree, that it should be exchanged.

The present invention provides a method of manufacturing tools and components of various types in such a way, that the mechanical and/or thermal load as well as the wear thereof can be measured.

The invention can be applied generally in industrial connections. The invention, however, also implies that research concerning the design of tools and components can be facilitated substantially by being able to record the conditions in the active surface or surfaces.

The present invention, thus, relates to a method of manufacturing state transducers for mechanical components intended to be subjected to wear, mechanical and/or thermal loads, especially state transducers for tools, and is characterized in that electric conductors and, where appropriate, electronic circuits of microsale for measuring wear, mechanical and/or thermal loads are applied on the surface of the component. The term microscale means electronic circuits of very small scale, e.g. microscopic circuits such as can be found in semiconductor chips. Also a protective coating is applied upon at least portions of said circuits and conductors, and that said conductors, circuits and protective coating are applied so as to form a unit atomically integrated with the mechanical component, which conductors and circuits are intended to be connected to a signal processing equipment or corresponding equipment. The phrase, a unit atomically integrated with the mechanical component, means a unit which constitutes the conductors, circuits and protective coating is atomically integrated with the mechanical component, for example, by a volatilization technique, or a sputtering process or a photochemical process.

The invention further relates to a mechanical component comprising state transducers capable to emit an electric signal in response to the state of the component, such as wear, mechanical and/or thermal load, and is characterized in that the state transducer comprises electric conductors and, where appropriate, electronic circuits of microscale capable to measure wear, mechanical and/or thermal load, which conductors and circuits have been applied on the mechanical component, and that a protective coating has been applied above at least portions of said circuits and conductors, and said conductors, circuits and protective coating have been applied so as to constitute a unit atomically integrated with the mechanical component, preferably by volatilization technique, so-called sputtering and/or a photochemical method, and that necessary connection terminals are provided for connecting the component to a signal processing or corresponding equipment.

It can be said generally, that the present invention can be applied in every case where it is desired to measure conditions concerning mechanical and/or thermal loads in a surface and/or wear of surfaces.

When the expression "in a surface" is used in the present description it is in certain connections meant in immediate vicinity of such a surface, for example 0.1–50 $\mu$m beneath the actual surface. A state transducer for example for temperature and/or forces acting on the surface, which is located at a distance of 0.1–50 $\mu$m beneath the surface, can in many cases be regarded to register the conditions in the surface.

The invention is described in the following partially with reference to the accompanying drawing showing embodiments of the invention, in which drawing FIG. 1 shows a cutting tool, FIG. 2 is a part of a section along the line A—A in FIG. 1, FIG. 3 is a part of a section through, for example, a tool, FIG. 4 illustrates a temperature transmitter, FIG. 5 illustrates a strain transmitter, FIG. 6 illustrates a pressure transmitter and a temperature transmitter, FIG. 7 illustrates a transmitter comprising a calculation circuit.

The invention, as stated above, can be applied to components of various types, but it is exemplified by tools for cutting operations.

In FIG. 1 a cutting tool 1 is shown, which is of the type normally made of cemented carbide. The cutting tool has three sides 3, 4, 5, the transitions of which to the upper and, respectively, lower surface constitute cutting edges.

In FIG. 2 a part of a section along the line A—A in FIG. 1 is shown, where the surface 6 in the section constitutes a surface, the wear and/or loads of which are desired to be measured.

The cutting tool 1 shown in FIGS. 1 and 2 is an example of a mechanical component, which comprises a state transducer capable to emit an electric signal in response to: the state of the components. The term state is to be understood as, for example, wear, mechanical and/or thermal load. The basic material of the cutting tool 1 can be, for example, cemented carbide 7 or high speed tool steel. As cemented carbide is electrically conductive, a layer 8 of an electrically non-conducting material has been applied thereon. A layer 9 comprising electric conductors and, where appropriate, electronic circuits and a protective coating 10 also have been applied.

A material suitable for the electrically non-conducting layer is alumina ($Al_2O_3$), but of course also other electrically non-conducting materials can be used. This layer preferably is applied by volatilization technique, i.e. the material is applied by being caused to evaporate and precipitate on the component in question. The term volatilization technique used in the descriptive part and claims is to be understood as the volatilization technique utilized at the manufacture of integrated circuits. The thickness of the layer preferably is 1–10 micrometer.

So-called sputtering can also be used. Sputtering implies bombardment of a material with ions, which yields sputtering. The dust coats the substrate to be coated. Variants of volatilization technique and, respectively, sputtering are also regarded comprised in these terms.

In cases when the basic material 11 is an electrically non-conducting material, as for example a ceramic material, see FIG. 3, an electrically insulating layer is not required, but it can still be advantageous to apply a layer thereon which is bound atomically both to the basic material and to the layer comprising electric conductors and, when appropriate, electronic circuits.

Upon the insulating layer 8 or, alternatively, the basic material 11 a measuring film is applied, which consists of said layer 9 comprising electric conductors and, when appropriate, electronic circuits. Said layer 9 as well as said protective layer 10 and insulating layer 8 are applied so as to form a unit atomically integrated with the mechanical component. According to a preferred embodiment, said layers 9, 10 are applied by means of volatilization technique, and in other respects in the same way as conventionally used at the manufacture of integrated circuits.

According to another embodiment of the invention, said conductors, circuits and/or said protective layer are applied by means of a photochemical method of the kind used conventionally at the manufacture of electronic circuits.

The measuring film 9 in a simple design can consist only of an electric conductor, and in a complicated design of a complete integrated circuit capable to carry out calculations and comprising transmitters for the parameters desired to be measured. Such circuits, of course, are made of the same material as normally used at the manufacture of integrated circuits, viz. silicon and silicon compounds, titanium and germanium compounds etc. Other suitable materials are aluminium, silver, copper and gold. The material in the measuring film, of course, must be adapted to the mechanical and/or thermal loads intended for the mechanical component. The invention, therefore, is not restricted to the use of certain materials mentioned by way of example.

Upon the measuring film 9 the said protective layer 10 is applied in the way stated above. The protective layer is applied upon at least portions of said circuits and conductors. Immediately on top of said circuits and conductors a layer of electrically non-conducting material, for example $Al_2O_3$, is applied.

The protective layer preferably also is a wearing course for effectively protecting the measuring film. The protective layer 10 preferably comprises one or several layers of one or some of the compounds titanium nitride TiN, titanium carbide TiC or oxide of aluminium $Al_2O_3$, or other suitable compounds, such as boron nitride.

The measuring film has a thickness as it is normal for integrated circuits or conductors here concerned. The thickness of the protective layer, of course, is chosen according to the application field of the component, but usually can be 1–50 μm.

The said conductors are connected, to the degree required, to connection terminals 12, 13, 14, to which contact pins or the like are intended to abut for connecting the electric conductors and, when appropriate, circuits to a signal processing or corresponding equipment, separate from the mechanical component, for evaluating electric signals received from the measuring film. The connection terminals can be formed by preventing the protective layer 10 from covering a certain area of the respective conductor.

It is obvious, that the invention is not restricted to any special type of circuit or transmitter in the measuring film. In FIGS. 4–7 examples of transmitters are shown which constitute different embodiments of the invention. The measuring film portions shown in FIGS. 4, 5 and 7 are shown in the plane of the surface of the component where the protective layer 10 is removed.

FIG. 4 shows a thermocouple comprising a first point 15 of Pt and a second point 16 of Pt/Rh, which are connected to conductors 17, 18, which can be connected to a calculation circuit or collecting circuit 19 or be connected directly to terminals 12, 13.

According to a preferred embodiment, the said electronic circuits comprise a piezo-electric component 20 capable to measure pressure and/or mechanical stress.

According to a preferred embodiment, the said electronic circuits comprise a temperature-transmitting component, preferably a thermistor 22. These components 20, 22 are built-up by a technique known for the manufacture of integrated circuits, which technique, therefore, is not described in detail in this connection. The components 20, 22 are connected to respective conductors 21, 23.

In FIG. 6 the piezo-electric component, which may consist, for example, of silicon dioxide or barium titanate, is shown extending all through from the surface of the basic material 11 to the outer surface 24. The thermistor 22 is shown extending through the layer 8 located nearest to the basic material. It is exemplified by these two embodiments, that the electronic circuits and electronic components enclosed therein must not necessarily be formed only in the measuring film 9.

According to a further preferred embodiment, the said electronic circuits comprise conductors 25, 26, 27, 28; 29, 30, which are capable to emit an electric signal in response to the strain state of the conductor or conductors when an electric voltage is applied on the conductor or conductors. In FIG. 5 such a circuit is shown by way of example, which is built-up as a conventional strain gauge. In FIG. 7 only one conductor 29, 30 is attached to the respective measuring place, while the remaining portion of the bridge connection shown in FIG. 5 is replaced by a circuit comprised in the calculation circuit 19, to which the conductors 29, 30 are connected via electric conductors 31, 32, 33, 34. In FIG. 7 the numerals 39–43 designate conductors extending from the calculation unit 19 to connection terminals (not shown).

According to a further preferred embodiment, the said electronic circuits comprise one or several conductors 35–38, which are attached beneath the protective layer 10 in that portion or those portions of the mechanical component which in operation are subjected to greatest wear. In the case of cutting tools, one or a number of conductors preferably are positioned at the cutting edges. In such a case a wear layer of sufficient thickness of, for example, TiN, TiC and/or $Al_2O_3$ is applied as in the case of commercially available cemented carbide cutting bits. At such bits it is desired to obtain an indication on, for example, when the wear layer is worn out and also to what extent the bit is worn.

By applying one or several conductors in the way stated above and measuring their resistance, an indication is obtained immediately when the wear layer is worn out, because the corresponding conductor then is worn off entirely or partially, and the resistance through the conductor thereby is changed.

By arranging such conductors in parallel with each other in the area where the cutting edge gets worn, the degree of wear of the bit can be indicated successively. As the cutting edge and the wear layer in question are moved successively with the wear of the bit, a plurality of conductors can be arranged so that the conductors successively get worn when the bit gets worn. By the arrangement of such conductors an indication also can be obtained immediately when pieces of the edge break away or the edge breaks down.

Transmitters for pressure, mechanical stress, strain, temperature and wear have been stated above as preferred embodiments. It is apparent, however, that transmitters for other magnitudes can be built-up in a corresponding way. The invention, therefore, must not be regarded restricted to the embodiments stated above.

It is, for example, possible to build-up several layers where electronical circuits are located in different layers laid one above the other which, when appropriate, are separated by layers with electrically insulating properties.

It also is possible to build-up several electronic circuits on the same mechanical component, and a plurality of transmitters, as for example thermistors, can be provided for being able to measure the distribution of a magnitude, for example the temperature.

It is apparent that the present invention renders it possible to measure different conditions in the surface of a mechanical component. This is possible due to the fact that the respective transmitters can be dimensioned very small and be positioned in or very close to the surface, because the transmitters form a unit atomically integrated with the component.

The said signal processing equipment is of a suitable known type. It is, of course, adapted to in which degree calculations or other signal processing are carried out in the electronic circuit or calculation unit comprised in the component.

The invention has been described above by way of example referring to a cutting tool consisting of a turnable cutting bit. The invention, however, can be applied to other mechanical components, for example, to drills concerning wear, plastic pressing tools concerning temperature, to bearings concerning temperature and mechanical stress, to shafts concerning mechanical strain, etc.

The present invention, thus, must not be regarded restricted to any special mechanical component or any special design of the electric conductors or circuits, but can be varied within the scope of the attached claims.

We claim:

1. A mechanical component comprising in combination therewith at least one state transducer, and associated electric conductors (17, 18; 21, 23; 31–34), said transducer including at least one electronic circuit (20, 22, 29, 30; 35–38), and which transducer will emit an electric signal in response to the state of the component to which the transducer is responsive, and which transducer is capable of measuring and measures at least one operational state, to which said mechanical component is subjected, selected from a group of operational states consisting of state of wear, state of mechanical load and state of thermal load; said component having at least one active planar load bearing surface which is subject to at least one of said operational states; and wherein said transducer and its electric conductors have been applied upon said active planar surface of the component (7; 11) that will be subjected to said at least one operational state; and where a protective layer (10) is applied upon at least portions of said transducer and its conductors; said transducer and said conductors are applied on a microscale upon said planar active surface of the component, which said transducer including said at least one circuit are covered with said protective layer (10); and said transducer and any said circuits and said protective layer are an atomically integrated unit with said component (7, 11) so that said protective layer becomes the planar load bearing wear layer at said planar surface of the component; and that necessary connection terminals (12–14) are provided to enable connecting the component and state transducer to signal processing equipment.

2. A mechanical component and at least one state transducer as defined in claim 1 wherein said transducer and any said circuits and said protective layer have been applied by means of volatilization resulting in said atomically integrated unit with said component.

3. A mechanical component and at least one state transducer as defined in claim 1 wherein said transducer and any circuits and said protective layer have been applied by means of sputtering resulting in said atomically integrated unit with said component.

4. A mechanical component and at least one state transducer as defined in claim 1 wherein said transducer and any circuits and said protective layer have been applied by means of a photochemical method resulting in said atomically integrated unit with said component.

5. A component as defined in claim 1, characterized in that said protective layer consists of a layer of electrically non-conducting material atomically integrated with and immediately upon said circuits and conductors, which protective layer also is a wear layer and is selected from any compounds in the group consisting of the components TiN, TiC or $Al_2O_3$.

6. A component as defined in claim 1, characterized in that said at least one electronic circuit comprises a piezoelectric component (20) capable of measuring pressure and mechanical stress.

7. A component as defined in claim 1, characterized in that said at least one electronic circuit comprises conductors (25-28; 29, 30) capable of emitting an electric signal in response to the strain state of the conductors.

8. A component as defined in claim 1, characterized in that said at least one electronic circuit comprises a temperature-transmitting component (22).

9. A component as defined in claim 8, wherein said temperature-transmitting component is a thermocouple.

10. A component as defined in claim 8, wherein said temperature-transmitting component is a thermistor.

11. A component as defined in claim 1, characterized in that said electronic circuits comprise at least one conductor (35-38) attached beneath said protective layer in at least one of the portions of the component (7; 11) which in operation will be subjected to greatest wear, and the resistance of said conductor is scanned.

12. A mechanical component in combination with at least one state transducer, as defined in claim 1, wherein said transducer will measure the state of wear of said component.

13. A mechanical component in combination with at least one state transducer, as defined in claim 1, wherein said transducer will measure the state of mechanical load on said component.

14. A mechanical component in combination with at least one state transducer, as defined in claim 1, wherein said transducer will measure the state of thermal load in said component.

* * * * *

UNITED STATES PATENT AND TRADEMARK OFFICE
CERTIFICATE OF CORRECTION

PATENT NO. : 4,945,770
DATED : August 7, 1990
INVENTOR(S) : BIRGER ALVELID and RALPH CRAFOORD It is certified that error appears in the above-identified patent and that said Letters Patent is hereby corrected as shown below:

On the cover sheet:

Column 1, in item [76], beside "BIRGER ALVELID" cancel "41296 Goteborg" and substitute --Molnlycke--.

On the cover sheet, column 1, please add the following information to line item [63], before the word "abandoned":

--filed as PCT/SE86/00001 on Jan. 2, 1986, published as WO87/04236 on July 16, 1987,--.

Signed and Sealed this

Twentieth Day of August, 1991

Attest:

HARRY F. MANBECK, JR.

*Attesting Officer*  *Commissioner of Patents and Trademarks*